(12) United States Patent
Schuster et al.

(10) Patent No.: US 9,685,779 B2
(45) Date of Patent: Jun. 20, 2017

(54) MAGNETOTHERMAL CURRENT LIMITING DEVICE

(71) Applicant: SCHNEIDER ELECTRIC INDUSTRIES SAS, Rueil-Malmaison (FR)

(72) Inventors: Philippe Schuster, Grenoble (FR); Nathalie Caillault, Vourey (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/438,043

(22) PCT Filed: Nov. 25, 2013

(86) PCT No.: PCT/FR2013/052837
§ 371 (c)(1),
(2) Date: Apr. 23, 2015

(87) PCT Pub. No.: WO2014/087074
PCT Pub. Date: Jun. 12, 2014

(65) Prior Publication Data
US 2015/0263515 A1    Sep. 17, 2015

(30) Foreign Application Priority Data
Dec. 3, 2012   (FR) ...................................... 12 61533

(51) Int. Cl.
*H01F 17/06*        (2006.01)
*H01F 21/08*        (2006.01)
(Continued)

(52) U.S. Cl.
CPC ............... *H02H 9/02* (2013.01); *H01F 1/015* (2013.01); *H01F 29/00* (2013.01); *H01F 38/023* (2013.01); *H02H 7/226* (2013.01)

(58) Field of Classification Search
CPC .......... H01F 29/00; H01F 1/105; H01F 38/28; H01F 38/30; H01F 38/32; H01F 38/34; H01F 27/427; H02H 9/02; H02H 7/226
(Continued)

(56) References Cited

U.S. PATENT DOCUMENTS 6,844,799 B2 * 1/2005 Attarian ............... G01R 15/183
                                                         335/18
7,444,826 B2   11/2008 Sargent et al.
(Continued)

FOREIGN PATENT DOCUMENTS

| WO | 2005/006455 A1 | 1/2005 |
| WO | 2006/003111 A1 | 1/2006 |
| WO | 2012/013237 A1 | 2/2012 |

OTHER PUBLICATIONS

International Search Report Issued Feb. 6, 2014 in PCT/FR13/052837 Filed Nov. 25, 2013.

*Primary Examiner* — Mangtin Lian
(74) *Attorney, Agent, or Firm* — Oblon, McClelland, Maier & Neustadt, L.L.P.

(57) ABSTRACT

A current limiting device including a transformer including an element made from a magnetothermal material, a primary conductor, and a secondary winding. Heat is generated by the current flowing through the primary conductor and when the current exceeds a certain threshold it modifies the coupling coefficient of the transformer, which makes it possible to limit the current in the primary conductor.

8 Claims, 2 Drawing Sheets

(51) Int. Cl.
*H01F 27/24* (2006.01)
*H02H 9/02* (2006.01)
*H01F 38/02* (2006.01)
*H01F 1/01* (2006.01)
*H01F 29/00* (2006.01)
*H02H 7/22* (2006.01)

(58) Field of Classification Search
USPC .................................. 336/155, 173, 175, 176
See application file for complete search history.

(56) References Cited

U.S. PATENT DOCUMENTS

| | | | |
|---|---|---|---|
| 7,837,807 B2 * | 11/2010 | Yoshizawa | C22C 38/002 148/303 |
| 2011/0030939 A1 | 2/2011 | Carroll et al. | |
| 2011/0094243 A1 | 4/2011 | Carroll et al. | |

* cited by examiner

MAGNETOTHERMAL CURRENT LIMITING DEVICE

TECHNICAL FIELD

The invention relates to the protection of electrical lines. In particular, the invention relates to devices limiting the current in electrical installations, in particular for low voltage scenarios.

PRIOR ART

In electrical distribution networks, the presence of a fault can give rise to the flow of high currents which can damage apparatus on the line. To protect the apparatus, one of the solutions is to install circuit-breaker type switchgear. When the tolerance threshold of the apparatus is exceeded, it is placed offline by opening the contacts of the circuit-breaker cutting off the line. Another option is to install static devices, without the opening of contacts, for example the insertion of a high impedance, which however exhibits the drawback of modifying the line characteristics, including in normal operating mode.

To avoid this drawback, current limiter devices have been developed, the behavior of which differs according to whether or not the current exceeds a threshold. Thus, documents WO 2006/003111 or WO 2012/013237 present a winding coiled around a magnet, the magnetic characteristics of which are chosen in order that the magnetization is dependent on the current in the coil so as to allow a modification of the current flowing therein, and by extension a limiting of the current flowing in the line which is connected to it.

One line of development of current limiter devices concerns the use of superconducting materials, the impedance of which varies with temperature. One of the options, as described in WO 2005/006455, thus concerns the direct insertion of a superconducting element in an electrical line. Under nominal current, the superconductor exhibits zero impedance and does not affect the line. When the current exceeds a threshold value, the impedance increases sharply, and the current is limited. This type of solution however seems appropriate mainly for transmission at high voltage given the complexity and cost of the cryogenic infrastructure to be implemented.

Another approach relates to the use of inductive type current limiting devices, the secondary of which is equipped with a superconducting element, as illustrated in FIG. 1. Such a limiting device 1 is based on the principle of the transformer, with a magnetic circuit 2 coupling a primary winding 4 which is connected to the line 5 to be protected and a secondary winding 6 connected to a circuit of variable resistance due to the presence of a superconducting element 8. Under nominal current, the secondary winding 6, then non-resistive, does not have any effect on the line 5. The secondary 6 becomes resistive under a fault current, due to the critical characteristic of the material 8 being passed, dependent on its temperature, on the magnetic field applied and on the current, and its resistance 8 is reflected in the primary 4 for which the current is limited.

However, this type of device 1 with a superconductor 8 exhibits the major drawback of requiring a cryogenic environment 9, conventionally of liquid helium or nitrogen, thereby making its use problematic. Furthermore, the temperatures at play lead to constraints on solders or other connections. The notable bulkiness, operating cost and vital maintenance for this type of device 1 mean that its use can be considered for medium and high voltage applications, but very unlikely for low voltage applications.

SUMMARY OF THE INVENTION

Among other advantages, the invention aims to overcome drawbacks of existing current limiters. In particular, the invention proposes a current limiting device to be installed on an electrical line, not requiring cryogenic means and not altering the impedance of the circuit under nominal current, particularly suited for low voltage applications.

In one of its aspects, the invention thus relates to an inductive type current limiting device, comprising a magnetic circuit coupling a primary intended to be connected to the line to be protected and advantageously comprising two connection terminals at its ends, and a secondary associated with a limiting resistance, the value of which referred to the primary is equal to the voltage of the network divided by the desired value for the limited current. Each of the primary and secondary can comprise coiling, notably of copper wire, around the magnetic circuit which is preferably in the shape of a torus.

According to the invention, the magnetic circuit comprises a magnetothermal (or magnetocaloric) material, i.e. a material for which the magnetization increases with temperature above a first temperature greater than or equal to 330 K, and notably exhibits a peak, the maximum of which is greater than 40 emu/g, and increases with the magnetic field applied, with a rapid increase in magnetization between 350 K and a temperature of less than or equal to 420 K under a magnetic field of 0.2 to 2 T. The magnetocaloric material is in particular an alloy of nickel and manganese, preferably of the NiCoMnX type, where X is chosen from among aluminum, indium, antimony or tin.

The magnetic circuit can be made up in its entirety of said magnetocaloric material. Advantageously, in order to best adjust the operating parameters of the limiting device, the magnetic circuit can be formed of first portions of magnetocaloric material, and of second portions of "neutral" material, the magnetization of which is independent of temperature, preferably a magnetic material. The first and second portions can for example be alternate sectors of the magnetic circuit, such as two times two quarters of a torus, or be randomly mixed within the material forming it.

BRIEF DESCRIPTION OF THE DRAWINGS

Other advantages and features will become clearer from the following description of particular embodiments of the invention, which are given by way of illustration and are not at all limiting, and which are represented in the appended drawings.

DETAILED DESCRIPTION OF A PREFERRED EMBODIMENT

Figure 1:
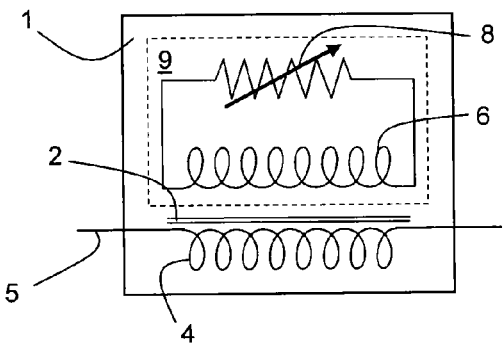
FIG. 1, already described, illustrates an inductive limiter with a superconductor.
Figure 2:
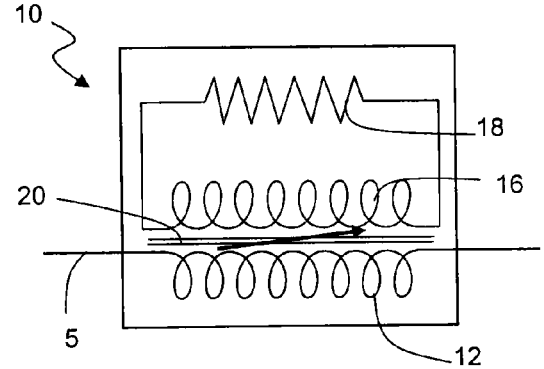
FIG. 2 shows a device according to the invention, with reference to the inductive limiter of FIG. 1.

The device according to the invention takes up the principle of the superconducting inductive limiter described previously with reference to FIG. 1. However, the value of the resistance of the secondary circuit is not modified by the current. When a current exceeds a threshold, this modifies the magnetic coupling by changing the magnetization of the magnetic circuit, as indicated in FIG. 2.

Figure 3:
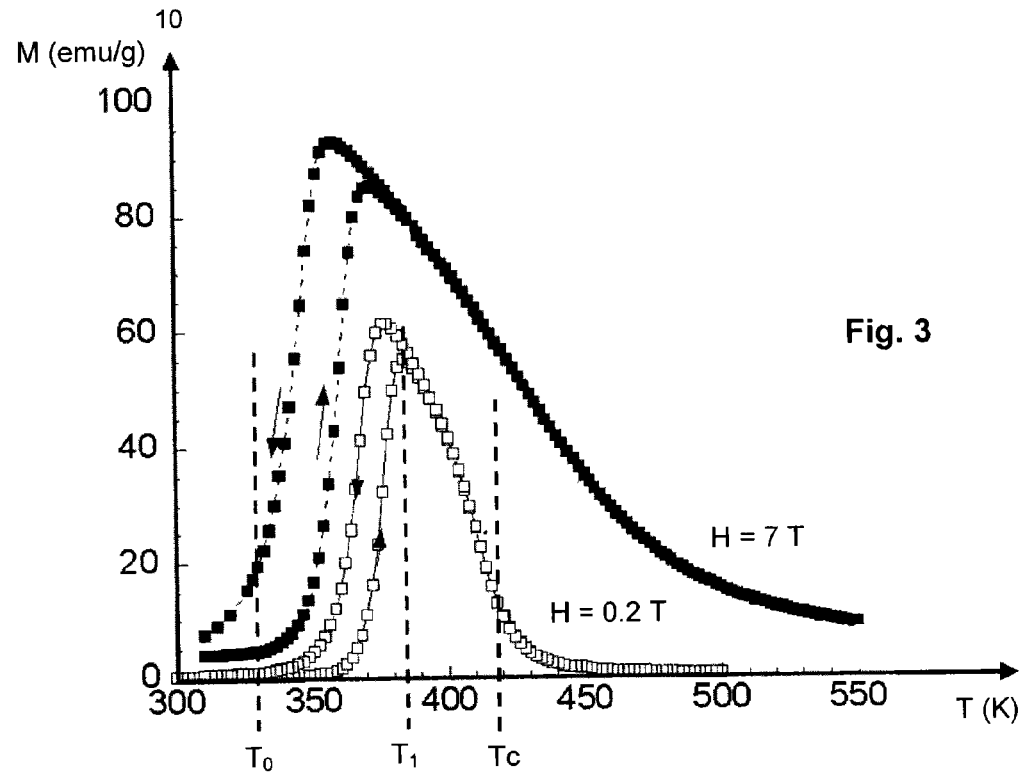
FIG. 3 shows the characteristics of the material which can be used in the magnetic circuit of a limiter according to the invention.

In particular, the material of the magnetic circuit is chosen for its magnetothermal, or magnetocaloric, properties. More specifically, as illustrated in FIG. 3, the material is such that its degree of magnetization M exhibits a peak dependent on temperature. Notably, at low temperature, the material is not very, or even not at all, magnetic. When the temperature increases, above a first temperature $T_0$, the magnetization M of the material increases rapidly, to reach a maximum at a second temperature $T_1$, above which the magnetization decreases until it is canceled at the Curie temperature Tc of the material. These various temperatures $T_0$, $T_1$, Tc are themselves dependent on the magnetic field H applied (see the variations obtained for a field of 0.2 T and a field of 7 T in FIG. 3).

For a use according to the invention, the first temperature $T_0$ is chosen to be greater than 330 K, preferably close to 350 K. This choice is made possible through the use of materials of the NiCoMnX family, where X∈{Al, In, Sb, Sn}, preferably aluminum or tin. For these materials, the transition is very marked with a temperature $T_1$ close to $T_0$ (difference of 10 to 30 K) and a high magnetization, in the order of 70 emu/g. Notably, for $Ni_{40}Co_{10}Mn_{33}Al_{17}$: $T_0$=347 K, Mmax=90 emu/g.

Figure 4A:
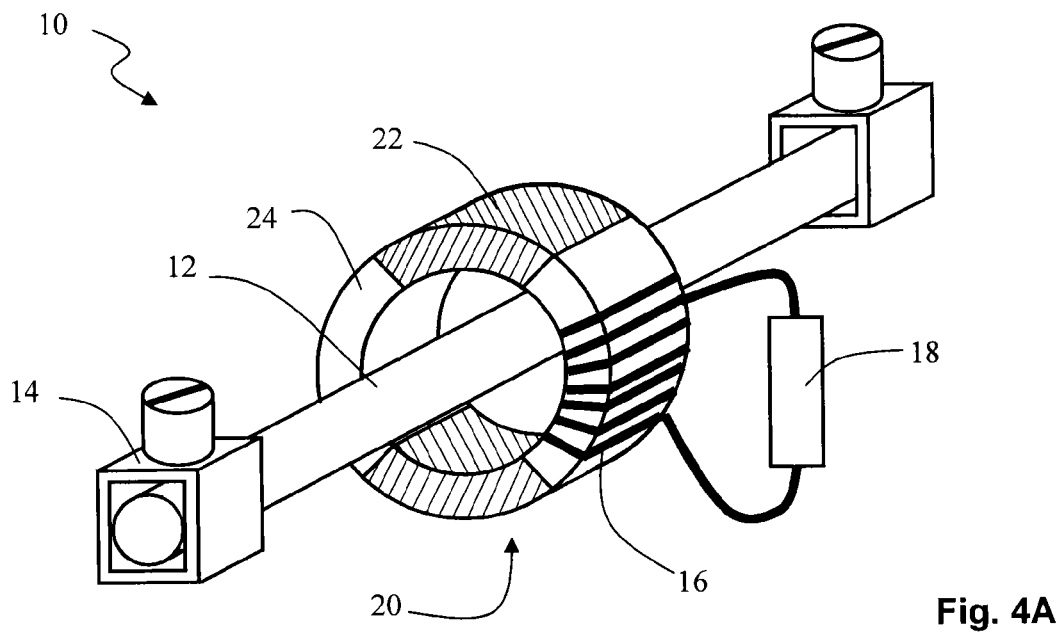
FIGS. 4A and 4B represent limiting devices according to two embodiments of the invention.

In particular, according to a preferred embodiment illustrated in FIG. 4A, the limiting device 10 according to the invention comprises a primary conductor 12 equipped at its ends with means 14 of coupling to the electrical line 5 to be protected, notably connection terminals. The primary 12 is magnetically coupled to a secondary 16, which comprises a limiting resistance 18, the characteristics of which are configured according to the result, with notably the limiting resistance 18 of the secondary 16 referred to the primary 12 equal to the voltage of the network divided by the desired value for the limited current. The coupling is produced by means of a magnetic torus 20 through which the two conductors, primary and secondary 12, 16, pass. In the embodiment illustrated, the primary 12 is in the form of a wire conductor which passes through the torus only once, while the secondary 16 is coiled several times around the torus 20.

In the presence of a nominal current in the primary 12, the limiting device 10 operates in the usual manner, with standard magnetic coupling defined by the cross-section of the conductors 12, 16, the value of the resistance 18 and the predefined characteristics of the magnetic circuit 20, the magnetization of which is constant at ambient temperature of use, notably between −30° C. et +50° C.

When the current in the line 5 increases, notably when it exceeds a fault value, the primary 12 is heated by the Joule effect, and the thermal effect thus produced leads to an increase in temperature within the magnetic circuit 20 which exceeds its phase change temperature $T_0$. The material is magnetized, and this non-magnetic/magnetic transition leads to a modification in the coupling coefficient of the transformer 10. Due to this change of coupling, the secondary circuit resistance 18, referred to the primary, increases and therefore makes the current in the primary circuit 12 fall.

Advantageously, a direct thermal contact is provided between the magnetic circuit 20 and the conductor 12. In fact, the magnetocaloric material sees its magnetic state dependent mainly on temperature. It is to be noted however that the magnetic circuit 20 sees its magnetic state dependent also on the magnetic field to which it is subjected, i.e. notably on the field induced by the primary 12: an increase in the primary current leads to a rise in the field H, and a modification of the magnetization curve with notably an increase in magnetization (see FIG. 3). Thus, the higher the primary current, the more marked the non-magnetic/magnetic transition, and the limiting effect thereof is strengthened, due to the strengthening of the primary/secondary coupling.

The dimensioning of the system 10 thus provides for setting the corresponding value of overload current in the primary 12 in order to locate, as a function of the induced field, the temperature generated at the torus 20 in the range $[T_0, T_1]$ of non-magnetic/magnetic phase transition of the material. In particular, it is possible to act on the cross-section and the number of turns of the primary and secondary electrical circuits 12, 16, on the value of the resistance 18 at the secondary, and on the length and cross-section of the magnetic circuit 20.

Furthermore, as illustrated also in FIG. 4A, it is possible to modify the proportion of active material in the magnetic circuit 20 so as to optimize the coupling coefficient and to refine the operating parameters of the limiter 10. In particular, according to the embodiment illustrated, the magnetic circuit 20 comprises an alternating arrangement of sectors 22 of magnetothermal material, and of sectors 24 of material that is inert with regard to temperature. Preferably, the magneto-stable sectors are formed by a material that is ferromagnetic regardless of the temperature, to ensure good coupling and therefore optimal limiting when the temperature increases.

Alternatively, the magnetic circuit 20 can be formed by first portions 22 of magnetocaloric material dispersed within a matrix 24 of ferromagnetic material. Any other alternative is possible for distributing first magnetocaloric portions 22 and second thermally stable magnetization portions. In particular, it is possible to use, for the magnetic coupling circuit, a lamination stack with an alternating arrangement of ferromagnetic sheets (FeSi, FeNi, FeCo) and of magnetocaloric sheets (NiMnCoX). The properties are then adjusted either by the relative thickness of the sheets of the two kinds, or by the number of sheets of each kind. The primary and secondary circuits can, for their part, be produced from any conducting material, notably copper or aluminum.

The device 10 according to the invention thus provides for a limiting of the current by a change of state of the magnetic circuit 20, obtained directly by the rapid variation of the properties of the material during a phase transition triggered by the effects of the fault current, which thus occurs at ambient temperature, therefore without requiring a cryogenic device.

These state change properties can also be used in the direct insertion of an inductance in the line to be protected in order to replace a superconductor by a magnetothermal material. Said inductance also changes from the non-magnetic state to the magnetic state according to the current flowing in the line itself, to in return modify the value of said current. This embodiment hence has the advantage of also limiting a DC current, but it requires a coiled primary thereby increasing dissipation in normal operation.

Figure 4B:
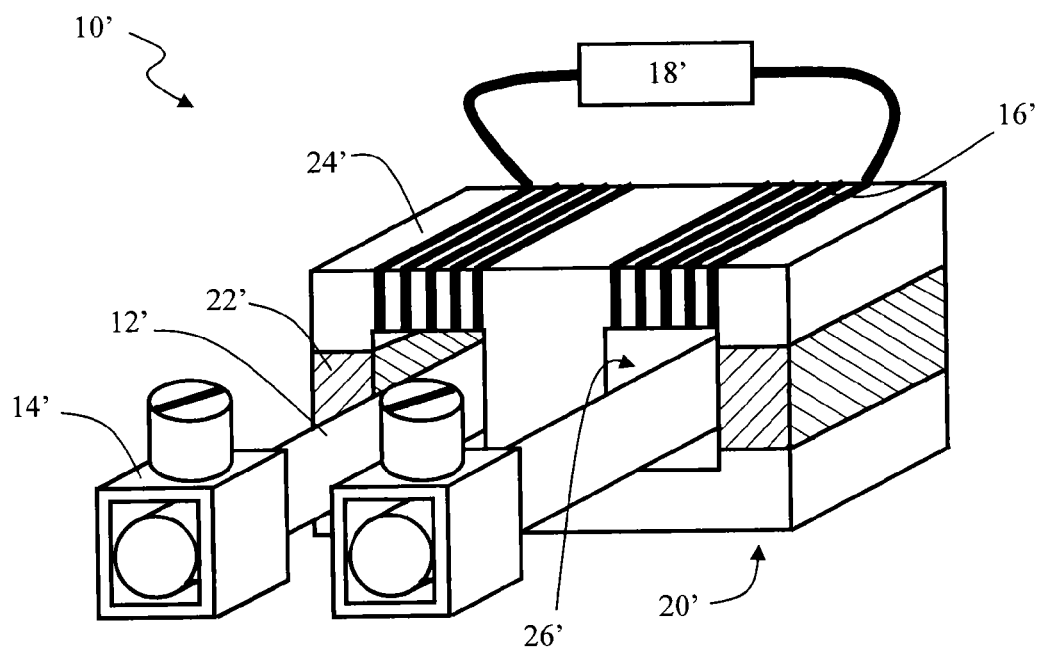

Although the invention has been described with reference to a limiting device 10 with a toric magnetic circuit, it is not limited thereto. In particular, as illustrated in FIG. 4B, a limiter 10' according to the invention can comprise two aligned terminals 14'. The primary 12 passes through the magnetic circuit 20' more than once, which magnetic circuit 20' can for example be in a figure-of-eight shape in order to be inserted around the branches of a U-shape forming a primary circuit 12'. In particular, the magnetic circuit 20' can be a magnetic parallelepiped 24' with two holes 26', the walls on one side at these holes 26' being formed by magnetocaloric material 22'. The secondary is preferably coiled the same number of times at each of the holes 26'. Any other alternative embodiment is possible.

The invention claimed is:

1. A current limiting device comprising:
a primary configured to be connected to an electrical line;
a secondary comprising a limiting resistance; and
a magnetic circuit that couples the primary and the secondary, wherein the magnetic circuit comprises a magnetocaloric material, magnetization of which increases with temperature above a first temperature greater than or equal to 330 K and reaches a maximum at a second temperature of less than 420 K, the magnetocaloric material being of NiCoMnX type, wherein X$\epsilon$\{Al, In, Sb, Sn\}.

2. The device as claimed in claim 1, wherein the magnetization maximum is greater than 40 emu/g.

3. The device as claimed in claim 2, wherein the magnetocaloric material has a magnetization maximum that increases with a magnetic field applied to the material.

4. The device as claimed in claim 1, wherein the magnetic circuit forms a torus with first portions made of magnetocaloric material and second portions made of material for which the magnetization is not modified above the first temperature.

5. The device as claimed in claim 4, wherein the first and second portions alternate to form sectors of the torus.

6. The device as claimed in claim 1, wherein the secondary comprises a winding of a conducting wire around the magnetic circuit.

7. The device as claimed in claim 1, wherein limiting resistance of the secondary referred to the primary is equal to a voltage of a network divided by a desired value for the limited current.

8. The device as claimed in claim 1, wherein the primary comprises a conductor passing through the magnetic circuit and including two connection terminals at ends of the conductor.

* * * * *